No. 610,696. Patented Sept. 13, 1898.
L. L. WILLIAMS.
BACK PEDALING BRAKE.
(Application filed Sept. 30, 1897.)
(No Model.)
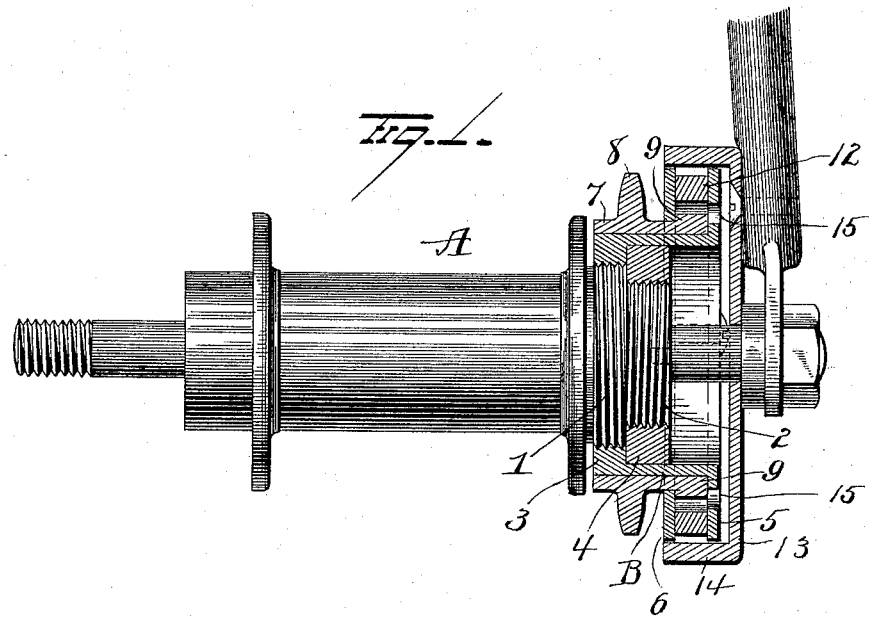
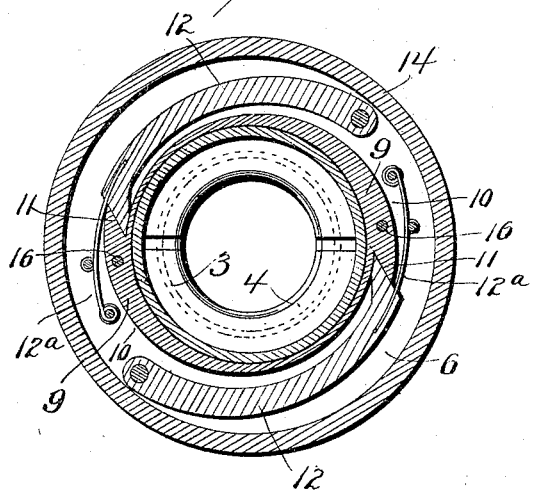
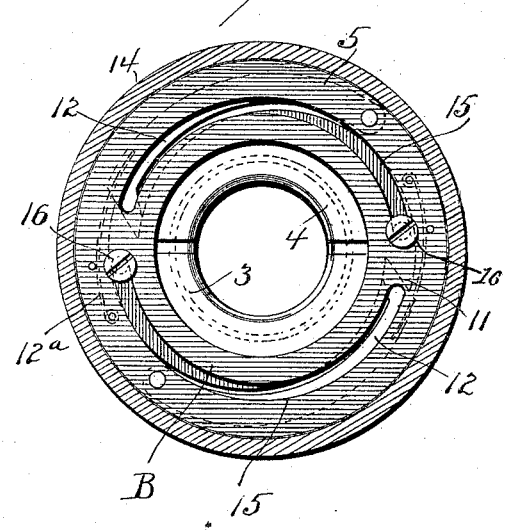
WITNESSES
E. J. Nottingham
G. F. Downing
INVENTOR
L. L. Williams
By H. A. Seymour
Attorney
THE NORRIS PETERS CO., PHOTO-LITHO., WASHINGTON, D. C.

UNITED STATES PATENT OFFICE.

LINFRID L. WILLIAMS, OF WYNCOTE, PENNSYLVANIA.

BACK-PEDALING BRAKE.

SPECIFICATION forming part of Letters Patent No. 610,696, dated September 13, 1898.

Application filed September 30, 1897. Serial No. 653,617. (No model.)

*To all whom it may concern:*

Be it known that I, LINFRID L. WILLIAMS, a resident of Wyncote, in the county of Montgomery and State of Pennsylvania, have invented certain new and useful Improvements in Brakes; and I do hereby declare the following to be a full, clear, and exact description of the invention, such as will enable others skilled in the art to which it appertains to make and use the same.

My invention relates to an improvement in brakes, and more particularly to such as are adapted for use with bicycles and tricycles, the object of the invention being to provide means whereby to produce a simple, efficient, and light brake adapted to be thrown into action by back-pedaling.

A further object is to produce a bicycle-brake which shall be simple and compact in construction and which shall be effectual in all respects in the performance of its functions.

With these objects in view the invention consists in certain novel features of construction and combinations and arrangements of parts, as hereinafter set forth, and pointed out in the claims.

In the accompanying drawings, Figure 1 is a sectional view illustrating my improvements. Figs. 2 and 3 are sectional views.

A represents the hub of a bicycle or tricycle wheel having screw-threaded portions 1 2, and B represents a sleeve or shell having an internal-screw-threaded flange 3 for the reception of the screw-threaded portion 1 of the hub. An annular jam-nut 4 is adapted to enter the sleeve or shell B and screw upon the threaded portion 2 of the hub, the portion 1 of the hub and the flange 3 of the shell being provided with right-hand threads and the portion 2 of the hub and the nut 4 being provided with left-hand threads, and thus the sleeve or shell B is secured to the hub of the driving-wheel of the machine.

The sleeve or shell B is provided at one end with an annular flange 5, and a short distance from said flange an annular disk or ring 6 is disposed, said flange and ring or disk being secured together (but spaced apart) by means of suitable pins or rivets. A sleeve or ring 7 is revolubly mounted on the sleeve or shell B, and a portion of this revoluble sleeve or ring is provided with an annular series of teeth or projections whereby to form a sprocket-wheel 8.

The revoluble sleeve or ring 7 is provided with two (more or less) flanges 9, having cam-faces 10 and each having a tooth or shoulder 11 at one end, said flanges being adapted to project into the space between the flange 5 of shell B and the ring or disk 6. Between the flange 5 and ring 6 and beyond the peripheral cam-faces of the flanges 9 pawls 12 are pivotally connected, said pawls corresponding in number to the number of cam-faces employed, and each pawl is provided at its free end with a tooth to engage the respective teeth or shoulders 11 at the ends of said cam-faces, so that when the sprocket-wheel is driven forwardly it will be locked to the shell B, and thus result in revolving the driving-wheel of the machine. Springs $12^a$ press the pawls against the cam-faces.

A disk 13 is secured to the frame of the machine in close proximity to the shell B and is provided with a peripheral flange 14 to embrace the flange 5 and the ring 6.

From this construction and arrangement of parts it will be seen that when back pressure, as in back-pedaling, is applied to the sprocket-wheel the ring or sleeve 7 will be made to turn backwardly independently of the shell B, so as to cause the cam-faces to operate to force the pawls outwardly into contact with the peripheral flange 14 of disk 13, and thus by frictional contact therewith result in braking the machine.

The flange 5 of shell B is provided with two (more or less) elongated slots 15, through which screws 16, secured to the cam-flanges, project, and in which said screws have just sufficient frictional resistance to keep the cams in proper position should the driving-chain break while the machine is running downhill. Thus it will be seen that when the brake is applied it will not be released should the chain break.

My improvements are simple in construction and are effectual in all respects in the performance of their functions.

Various slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. In a velocipede, the combination with the driving-wheel and a plate adapted to secured to the frame of the machine, of a sprocket-wheel, a cam carried by the sprocket-wheel, pawls connected with the driving-wheel and adapted to be forced against said plate by said cam and shoulders at the ends of the cams to be engaged by said pawls when forward pressure is applied to the sprocket to propel the machine, substantially as set forth.

2. The combination with the hub of a driving-wheel and a plate to be secured to the frame of a velocipede, of a sleeve or shell secured to said hub, pawls pivotally connected to said sleeve or shell, a sprocket-wheel, cams carried by said sprocket-wheel and each having a shoulder at one end to be engaged by the ends of the pawls when the sprocket-wheel is driven forwardly, said cams being adapted to force said pawls against said plate when back pressure is applied to the sprocket-wheel in back-pedaling, substantially as set forth.

3. The combination with the hub of a wheel having right and left hand screw-threads thereon and a plate adapted to be secured to the frame of a velocipede, of a shell adapted to screw on said hub, a jam-nut adapted to enter said shell and screw onto said hub, pawls carried by said shell, a sprocket-wheel and cams carried by the sprocket-wheel and adapted to force said pawls against said plate when back pressure is applied to said sprocket-wheel, said cams each having a shoulder thereon which is engaged by the end of one of the pawls so that when the sprocket-wheel is driven forwardly it will revolve the wheel, substantially as set forth.

4. The combination with the hub of a driving-wheel and a plate adapted to be secured to the frame of a velocipede, of a shell secured to said hub, a flange on said shell, a ring surrounding the shell and connected with said flange, pawls pivotally attached between said flange and ring, a sprocket-wheel mounted on said shell, cams carried by said sprocket-wheel and disposed between said flange and ring, said cams adapted to force the pawls against the said plate when back pressure is applied to the sprocket-wheel, springs forcing said pawls against the cams and a shoulder at one end of each of said cams to be engaged by the free ends of the pawls, substantially as and for the purpose set forth.

5. The combination with the hub of the driving-wheel and a plate to be secured to the frame of a velocipede, of a shell secured to said hub and having a flange provided with elongated slots, pawls carried by said flange, a sprocket-wheel, cams carried by the sprocket-wheel and adapted to force the pawls into contact with said plate when back pressure is applied to said sprocket-wheel, shoulders on the cams adapted to be engaged by the pawls when forward pressure is exerted whereby to revolve the driving-wheel, and screws or pins secured to said cams and projecting through said elongated slots in the flange on the shell so as to have frictional contact with the walls of said slots and thus retain the pawls in contact with said plate should the driving-chain of the machine break when the brake is applied, substantially as set forth.

In testimony whereof I have signed this specification in the presence of two subscribing witnesses.

LINFRID L. WILLIAMS.

Witnesses:
DAVID HARMER,
JOHN C. SCHMIDT.